No. 727,156. PATENTED MAY 5, 1903.
P. LACEY.
MILLSTONE.
APPLICATION FILED MAR. 15, 1902.
NO MODEL.

Witnesses

Inventor
P. Lacey.
By
Attorneys

THE NORRIS PETERS CO., PHOTO-LITHO., WASHINGTON, D. C.

No. 727,156. Patented May 5, 1903.

UNITED STATES PATENT OFFICE.

PATRICK LACEY, OF NEW YORK, N. Y.

MILLSTONE.

SPECIFICATION forming part of Letters Patent No. 727,156, dated May 5, 1903.

Application filed March 15, 1902. Serial No. 98,382. (No model.)

*To all whom it may concern:*

Be it known that I, PATRICK LACEY, a citizen of the United States, residing at New York, in the State of New York, have invented a new and useful Millstone, of which the following is a specification.

This invention relates generally to millstones, and more particularly to an attachment or appliance to an ordinary millstone whereby the material to be ground is kept away from the eye of the stone and thrown upon the grinding-surface, the object of the invention being to provide a simple attachment for the purpose of avoiding the clogging of the material to be ground at the center of the stone; and with this object in view the invention consists, essentially, in arranging a plate centrally of the millstone, said plate having curved blades or wings upon its upper surface whereby the material to be ground is fed toward the grinding or dressed surface of the stone.

The invention consists also in certain details of construction hereinafter fully described, and pointed out in the claim.

Figure 1:
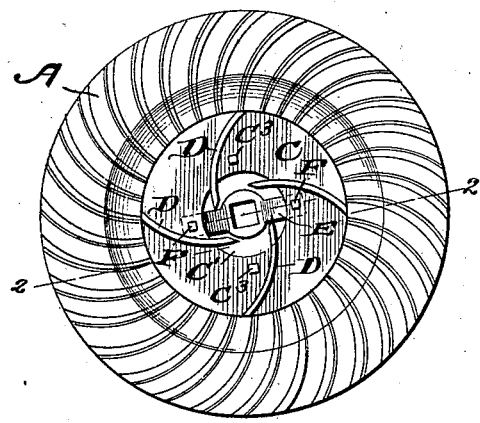
Figure 2:
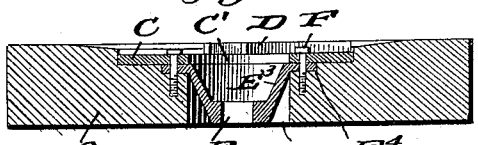
Figure 3:
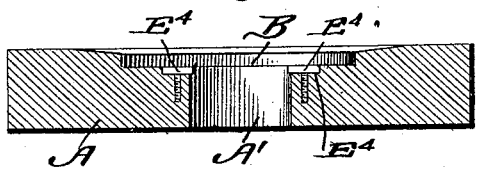
Figure 4:
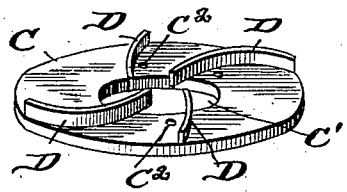
Figure 5:
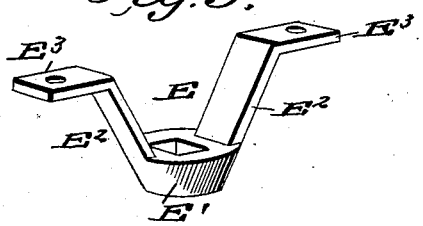
Figure 6:
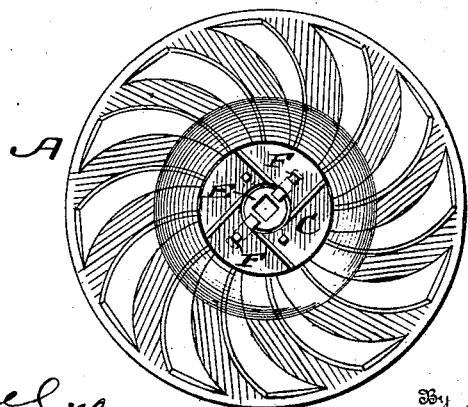

In the drawings forming part of this specification, Figure 1 is a face view of a millstone constructed in accordance with my invention. Fig. 2 is a sectional view on the line 2 2 of Fig. 1. Fig. 3 is a sectional view taken on substantially the same plane, the bail and plate being removed. Fig. 4 is a detail perspective view of the plate with the wings. Fig. 5 is a detail perspective view of the bail. Fig. 6 is a slight modification in which the wings or blades of the plate extend only to the edge of the central opening.

Referring to the drawings, A indicates a millstone, which may be cut or dressed in any preferred or desired manner, as the dressing of the stone forms no part of my invention. This stone is also formed with the usual eye $A'$, and in the upper surface of the said stone is produced a recess B, said recess being arranged centrally and surrounding the eye $A'$, and seated in said recess is a plate C, having a central opening $C'$, which registers with the eye $A'$, and the upper surface of this plate is provided with curved blades or wings D, which extend from the outer edge of the plate to points within the central opening $C'$, as most clearly shown in Figs. 1 and 4; but in Fig. 6 it will be noted that these plates terminate at the central opening and do not project beyond the edges of said opening. In order to secure the plate in the recess, I employ a bail E, which comprises the central hub portion $E'$, diverging arms $E^2$, and perforated ears or lugs $E^3$, which rest in sockets $E^4$, cut in the stone, as most clearly shown in Fig. 3, and the said bail is securely held in the eye of the stone by means of bolts F, which pass through the plate C and also through the perforated ears $E^3$, and thereby securely connect the plate to the bail and also secure the bail to the stone. The plate may also be provided with additional perforations $C^2$, through which set-screws $C^3$ may be passed for the purpose of adjusting or elevating the plate within the recess.

The operation of my invention will be obvious to every one skilled in the art to which it appertains, and it will be readily seen that as the stone is rotated for the purpose of grinding the action of the blades carried by the central plate will throw the material away from the eye of the stone toward the dressed or grinding surface. In this way the clogging of the material at the center or eye of the stone will be entirely avoided.

Having thus fully described my invention, what I claim as new, and desire to secure by Letters Patent, is—

A millstone having a bail secured in the eye thereof, and a plate arranged centrally upon the millstone and secured to the said bail, said plate having wings or blades arranged thereon, their inner ends extending over the eye of the stone and adapted to throw the ground material away from the center of the millstone, as specified.

PATRICK LACEY.

Witnesses:
H. D. HOUSE,
J. P. RYAN.